Nov. 23, 1971　　　R. C. VAUGHAN　　　3,621,724
VARIABLE DRIVE RATIO POWER TRANSMISSION

Filed Nov. 20, 1969　　　　　　　　2 Sheets-Sheet 2

INVENTOR
ROY CYRIL VAUGHAN

United States Patent Office 3,621,724
Patented Nov. 23, 1971

3,621,724
VARIABLE DRIVE RATIO POWER TRANSMISSION
Roy Cyril Vaughan, Dublin, Ireland, assignor of fractional part interest to Alan Salisbury Lamburn, Kencott, via Lechlade, Gloucestershire, England
Filed Nov. 20, 1969, Ser. No. 878,297
Claims priority, application Great Britain, Nov. 30, 1968, 56,953/68
Int. Cl. F16h 29/12
U.S. Cl. 74—63
12 Claims

ABSTRACT OF THE DISCLOSURE

In a power transmission an input shaft drives means provided to convert input torque into a pulsating torque applied to a member. A unidirectional drive element is connected between the member and a stationary part so that torque pulses in one direction of rotation cannot rotate the member in that direction, and an output shaft is connected to be driven by the member, preferably through a smoothing spring.

---

Figure 1:
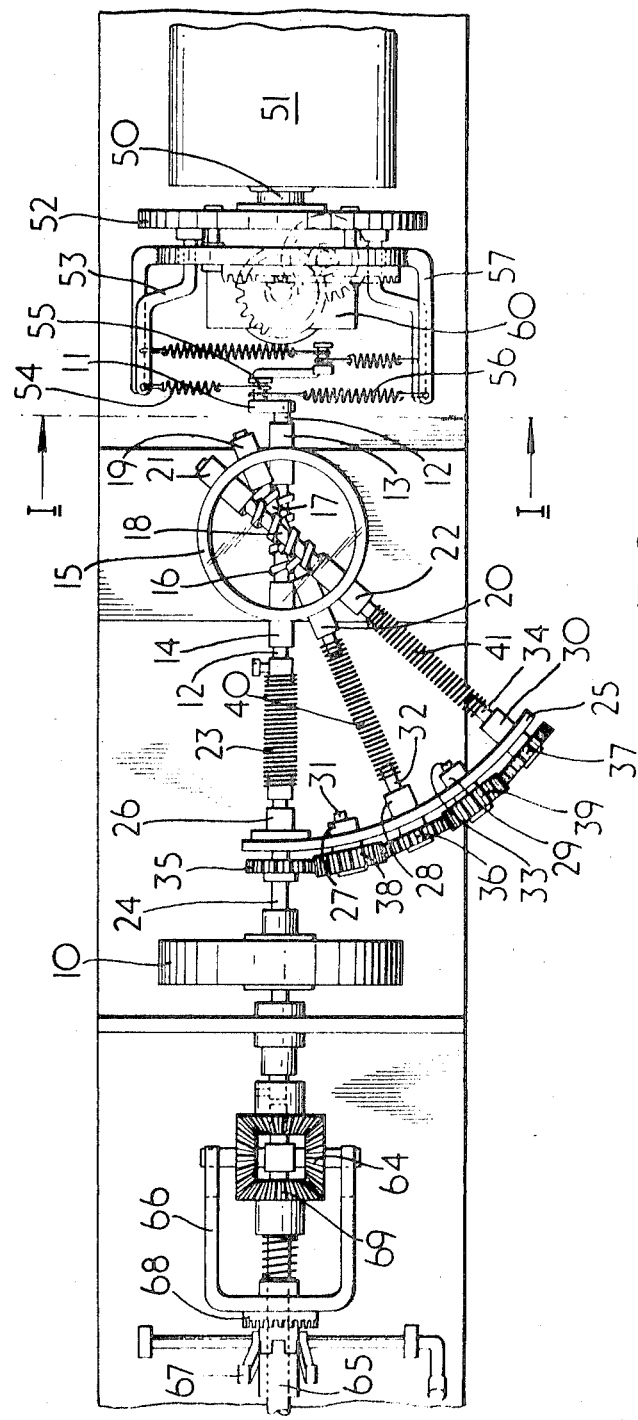

The invention relates to a variable drive ratio power transmission.

According to the invention, a power transmission includes a power input member, means for converting an input torque, transmitted to the transmission by the power input member, into a cyclically fluctuating torque of which torque pulses in one direction of rotation are alternated with torque pulses in the opposite direction of rotation, a first member to which the fluctuating torque is applied, a unidirectional drive element operatively interconnecting the first member and a second member, said unidirectional drive element arranged to permit the first member to rotate in one of the directions relative to the second member, without transferring a significant torque to the second member, and arranged to inhibit the first member from rotating freely in the other of the directions relative to the second member, and a power output member of the transmission connected to the first member, whereby the torque pulses applied to the first member will be transferred to the power output member in the said one of the directions with substantially unaltered average value and in the said other of the directions at a reduced average value so that the mean power output torque will be different from the mean power input torque.

Conveniently the unidirectional drive element is arranged to permit the first member to rotate in the said one of the directions which is in the opposite direction of rotation to the direction in which the power input torque is applied, whereby the mean power output torque will be in the opposite direction to the mean power input torque to provide a reverse drive. If desired the power input torque and the power output torque are of opposite direction but equal magnitude, to provide a reverse torque ratio of unity.

Conveniently the second member is a non-rotary member, whereby the mean power output torque will be of the same magnitude as the average value of the torque pulses applied to the first member in the said one of the directions. Preferably the power transmission includes a torsionally resilient means interconnecting the first member and the power output member for smoothing the pulsations of torque transmitted to the power output member. Furthermore, a flywheel may be rotatively fast with the power output member for smoothing the pulsations of torque transmitted to the power output member.

Desirably, a further flywheel is rotatively fast with the power input member and to which flywheel is connected the means for converting the input torque into the cyclically fluctuating torque, whereby to reduce the feedback of the cyclical fluctuations to the power input member.

Conveniently, means are provided for optionally varying the average value of the torque pulses in either direction.

Preferably, the means for converting the input torque into the cyclically fluctuating torque includes a flexible element connected between the power input member and the said first member for transmitting the torque therebetween, and means for cyclically varying the deflection of the flexible element whereby to generate the cyclical fluctuation in torque. Desirably a crank is fast with the first member, and the flexible element is connected between the throw of the crank and a radially displaced portion of the power input member, whereby relative rotation between the power input member and the crank will produce the cyclically varying deflection of the flexible element.

Conveniently, the means for optionally varying the average value of the torque pulses includes a further flexible element connected between the throw of the crank and a further radially displaced portion of the power input member, and the further radially displaced portion is movable circumferentially by actuator means relative to the said one radially displaced portion to alter the phase of the torque pulses generated on the crank by the said flexible element relative to those generated by the further flexible element, whereby the resultant torque may be varied. Preferably the flexible elements may be brought close together for reducing the torque substantially to zero. Furthermore, a further crank may be fast at 180° to the said crank and for each of the said flexible elements is provided a corresponding flexible element operative on the further crank and on a corresponding radially displaced portion of the power input member positioned at 180° to each of the aforesaid radially displaced portions, whereby to balance the radial forces on the first member and the power input member.

Conveniently, the actuator means includes an electric motor. If preferred a bevel gear set may be connected to be driven by the power output member and arranged to be engageable optionally to provide a direct drive or a reverse drive.

Preferably in the unidirectional drive element the first member is a first toothed gear, a second toothed gear is meshed with the first gear, the second member includes bearings defining the axes of rotation of the first and second gears, bias means are arranged to provide a sustained load between the flanks on the same side of the teeth of the first gear and the opposing flanks of the teeth of the second gear, and the gears are arranged such that, when the first gear is rotated so that the flank contacting the second gear tends to move towards the second gear, the gears will jam and inhibit rotation of the first gear in that direction, and when the first gear is rotated in the opposite direction the bias will keep the flanks on the other side of the teeth of the first gear from contacting the opposing flanks of the teeth of the second gear, whereby the gears will not jam and the first gear and the second gear will be able to rotate freely in that direction.

Figure 2:
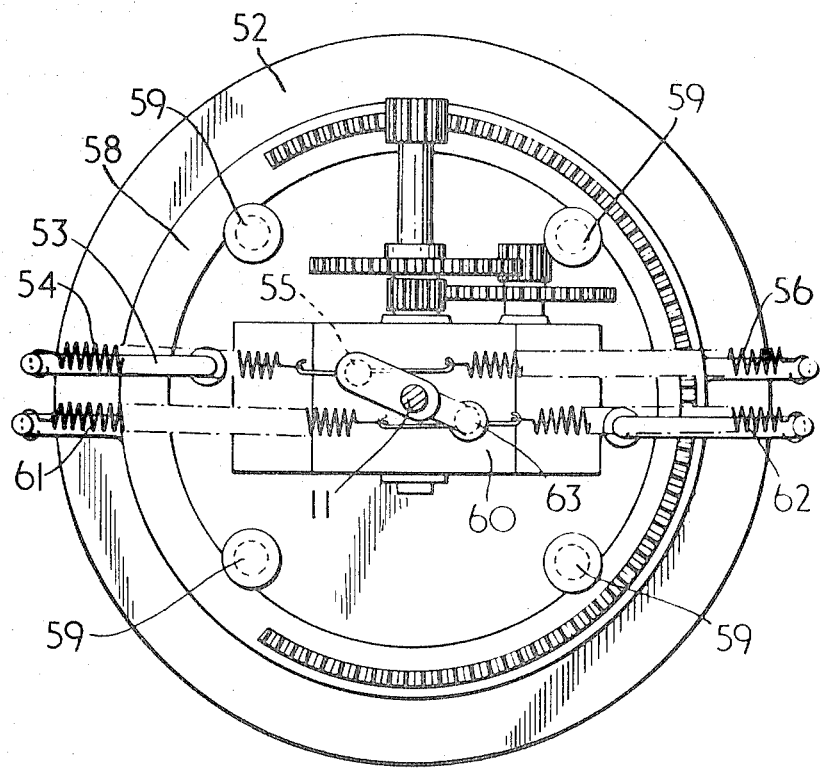

The invention is described, by way of example only, with reference to the accompanying drawings, in which:

FIG. 1 is a plan view of a power transmission, and
FIG. 2 is a section along the line I—I in FIG. 1.

In the drawings, the power transmission has an input shaft 50 driven by an electric motor 51, and a flywheel 52 is mounted on the input shaft 50. An axially-directed first arm 53 is fastened near the periphery of the flywheel 52, and a helically coiled first tension spring 54 is connected from one end of the first arm 53 to a rotatable attachment on a first crank pin 55 of the crankshaft 11, which is connected to a flywheel 10 by a unidirectional brake, of which the components are shown designated by the reference numerals 12 to 41 inclusive. Since this unidirectional brake 12–41 is described in detail in my copending U.S.A. patent application Ser. No. 878,296 this description will not be repeated in detail. However, it is sufficient for the purposes of this description to state that the unidirectional brake 12–41 enables the crankshaft 11 to be rotated in the same direction as the electric motor 51, but prevents the crankshaft 11 from rotating in the opposite direction. The stiffness of the first spring 54 is arranged such that when the crankshaft 11 is positioned at right angles to the axis of the spring 54, at which position the spring 54 will exert maximum torque on the crankshaft 11, the torque so exerted will be substantially greater than the maximum torque which can be exerted by the electric motor 51. The maximum torque exerted by the spring 54 may conveniently be as much as six times the torque exerted by the motor 51.

When the crankshaft 11 is at rest, and the electric motor 51 is started the latter will be unable to rotate because its torque will not be adequate to overcome the torque reaction from the spring 54. However, if the flywheel 52 is spun, the electric motor 51 will be enabled to keep it running. Clearly, as the first arm 53 rotates around the first crank pin 55 the spring 54 will be alternately elongated and shortened, and will exert a torque on the crankshaft 11 which consists of a series of substantially half-sinsuoidal torque pulses in one direction alternating with equal substantially half-sinusoidal torque pulses in the other direction. The torque pulses tending to rotate the crankshaft 11 in the opposite direction to the rotation of the electric motor 51, will be unable to rotate the crankshaft 11 because the unidirectional brake 12–41 will prevent the crankshaft 11 from rotating in the opposite direction to the electric motor 51. However, the torque pulses in the same direction as the rotation of the electric motor 51, will tend to drive the crankshaft 11 in that direction, relatively unrestricted. If the peak value of the torque generated on the crankshaft 11 by the first spring 54 is, for example, six times the torque generated by the electric motor 51, then the mean value of the torque transmitted through the unidirectional brake 12–41 to the power output shaft 24, will be in excess of the mean torque generated by the electric motor 51. In this way an output torque greater than the input torque will have been achieved. In most applications the pulsatory nature of the output torque to the output shaft 24 will be quite unacceptable, so that a first torsionally resilient spring 23 is introduced to smooth out the torque fluctuations. This process is further improved by the addition of the flywheel 10. Clearly the prewound springs in the unidirectional brake 12–41 must be prewound enough to keep them prewound when the spring 23 is twisted.

As the speed of the output shaft 24 rises from zero, the mean torque which the first spring 54 will exert upon the output shaft 24, will decrease until the output torque approaches the value of the torque generated by the electric motor 51. At this condition the difference in speed between the crankshaft 11 and the flywheel 52 will be relatively little, and the flywheel 52 will no longer be able to carry the first arm 53 past the point of maximum torque transmission through the spring 54 on to the crankshaft 11. Relative rotation between the flywheel 52 and the crankshaft 11 will then cease, and a cushioned direct drive will obtain.

The ratio of the output torque in the output shaft 24 when the latter is at rest, to the torque generated by the electric motor 51, is clearly dependent primarily on the throw of the crankshaft 11 and on the stiffness of the first spring 54, furthermore the speed at which direct drive ratio is engaged is also dependent on these factors. To provide for optional variation of the peak torque transmitted, and of the speed at which direct drive is engaged, a second spring 56 is connected to the crank pin 55 at one end, and at the other end to a second arm 57 which is fast on a ring 58 pivotally supported concentric with the flywheel 52 by engagement in slots formed in four pins 59 protruding from the face of the flywheel 52. The ring 58 is rotatable so that the second arm 57 may be brought adjacent the first arm 52, at which position the first and second springs 54, 56 will be acting in the same direction on the crank pin 55, and will together exert a torque of maximum value. However, as the ring 58 is rotated away from this position, the resultant forces produced by the springs 54, 56 will decrease until, when the first arm 53 has been rotated through 180° relative to the second arm 57, the springs 54, 56 will produce little or no torque fluctuation on the crankshaft 11.

The rotation of the ring 58 relative to the flywheel 52 may be effected optionally by any convenient actuator means, and is conveniently performed by a hydraulic actuator or by an auxiliary electric motor 60 which is connected to drive the ring 58 through a spur gear train. Preferably, all components fast with the armature of the auxiliary electric motor 60 have their centre of gravity substantially on the axis of rotation of the flywheel 32. Limit switches may conveniently be arranged to prevent further operation of the auxiliary electric motor 60, past the positions where the torque exerted by the springs 54, 56 on the crankshaft 11 is zero, or a maximum, and it is desirable to incorporate an unshown clutch between the electric motor 60 and the ring 58, arranged to slip when the ring 58 reaches one of these positions.

To balance the pull on the crankshaft 11 due to the tensions in the springs 54, 56 they are duplicated by identical springs 61, 62 which operate on a further crank pin 63 of the crankshaft 11, but disposed at 180° from the crank pin 55.

Although this embodiment has been described as using the type of unidirectional brake illustrated, any other suitable type of unidirectional brake may be utilised in its place. Furthermore, although a reverse drive of the output shaft 24 may be obtained by using a reversible unidirectional brake, of which several types are well known, it may be preferred to obtain a reverse drive ratio by other means, for example, by the bevel gear set 64. In this gear set direct drive is provided when a dog 65, fast with an output shaft, is engaged with a corresponding dog fast on a bevel planet carrier 66. To engage reverse drive, a stationary dog 67 is first moved into engagement with a further dog 68 fast with the planet carrier 66, to bring the latter to rest. Further movement of the stationary dogs 67 move the planet carrier 66 out of engagement with the dog 65, whereupon the planet bevels cause the output bevel 69, fast with the output shaft, to be rotated in reverse direction.

If the springs 54, 56 are moved to the position at which they transmit no drive torque, the electric motor 51 may be readily started, and a neutral condition is provided It may be convenient to arrange for the auxiliary electric motor 60 to return the springs to this condition when the main electric motor 51 is switched off.

A convenient method of controlling a motor, particularly an internal combustion engine, together with the power transmission which it is driving, is to provide a control member movable, for example, in a fore-and-aft direction to increase the torque delivered by the motor, and in a transverse direction to control the relative position of the springs 54, 56. With such an arrangement running in direct drive ratio, a substantially increased output torque may be readily obtained by moving the control member to the maximum motor torque position, momentarily moving it in one direction laterally towards the neutral position, to break the direct drive, and then to move the control member laterally in the opposite direction to increase the torque ratio.

It will be seen that, when operating away from the direct drive condition, the multiplication of input torque will be adjusted automatically and rapidly to suit the load applied to the output, even though this load may be varying. As the output load decreases, the torque and wind-up of the spring 23 will decrease correspondingly, causing the unidirectional brake to become unjammed earlier in the torque oscillation cycle. Thus the mean reaction torque applied to the stationary components of the unidirectional brake will be reduced which implies that the ratio of the output torque to the input torque will be reduced. As the load increases, the converse effect obtains, so that the output torque will tend to rise to overcome obstacles which necessitates such a torque rise.

It is envisaged that an embodiment of the invention may be used as a constant speed drive, for example to be used between a variable speed prime mover and an electrical alternator. A suitable governor is provided on the output shaft 24 and is arranged to make contacts when over speed to rotate the auxiliary electric motor 60 in the direction which will move the springs 54, 56 away from each other so that drive will be at reduction ratio. When the output shaft 24 is under speed the governor is arranged to make other contacts which will reverse the direction of the motor 60 and bring the transmission towards direct drive ratio.

In a similar embodiment the invention may be used to provide a reduction ratio between, for example, the main crankshaft of a motor vehicle engine and the engine auxiliaries such as cooling fan and generator. It is desirable to minimise the speed rise of such auxiliaries above a certain engine speed. Where the auxiliaries absorb greater torque with increasing speed it is convenient to provide a pair of radial arms fastened on the main crankshaft. To the outer end of each arm is fastened the outer end of one of the springs 54 and its corresponding spring 62. The inner spring ends are pivoted to throws 55, 63 of the crankshaft 11, which may be carried in bearings in a bore in the nose of the main crankshaft. The crankshaft 11 is connected through a suitable smoothing spring to drive the normal V-belt pulley for the auxiliaries. A unidirectional brake of suitable type is connected between the crankshaft 11 and a stationary member. The springs 54, 62 combined with the crankshaft 11 are chosen to give direct drive between the main crankshaft and the V-belt pulley up to the certain engine speed. Above that speed the torque to the auxiliaries exceeds the direct drive torque of the spring/crankshaft combination, so that there is a reduction ratio drive between the main crankshaft and V-belt pulley above that certain speed.

Another application of the invention is to drive such as an agricultural tractor power take-off, where a driven digging blade may meet an obstruction which would normally stall the engine. The invention may be incorporated so as to give direct drive at normal loads but to multiply the torque and utilise engine inertia to break away from the obstruction. It may be beneficial to provide means whereby the driver, or automatically, releases the normally stationary side of the unidirectional drive element so that the drive to the machine would become oscillatory. This would assist to break up the obstruction, when the drive could revert to unidirectional.

Clearly in some embodiments it may be preferable to omit the springs 56 and 61 and provide the variable torque capacity by variable throw cranks or variable eccentricity sheaves in any well known manner.

It has been found in certain embodiments that as the transmission approaches direct drive ratio there is a tendency for the crankshaft 11 to rotate momentarily faster than the flywheel 52 during some parts of the cycle. If desired this mode of operation can be suppressed by connecting a further unidirectional drive element of suitable type between the flywheel 52 and crankshaft 11 in such a way that the latter will not rotate faster than the flywheel 52.

What I claim as my invention and desire to secure by Letter Patent of the United State is:

1. A power transmission including a power input member 50, and a power output member 24, wherein the improvement comprises means for converting an input torque, transmitted to the transmission by the power input member, into a cyclically fluctuating torque of which torque pulses in one direction of rotation are alternated with torque pulses in the opposite direction of rotation, a first member 11 to which the fluctuating torque is applied, a unidirectional brake means 13, 14, 16-23, 26-41 operatively interconnecting the first member and the power output member, and a second member 15 supporting the first member, said unidirectional brake means arranged to permit the first member to rotate in one of the directions relative to the second member, without transferring a significant torque to the second member, and arranged to inhibit the first member from rotating freely in the other of the directions relative to the second member, whereby the torque pulses applied to the first member will be transferred to the power output member in the said one of the directions with substantially unaltered average value and in the said other of the directions at a reduced average value so that the mean power output torque will be different from the means power input torque.

2. A power transmission, as in claim 1, in which the unidirectional brake means is arranged to permit the first member to rotate in the said one of the directions which is in the same direction of rotation to the direction in which the power input torque is applied, whereby the mean power output torque will be in the opposite direction to the mean power input torque to provide a reverse drive.

3. A power transmission, as in claim 1, in which the second member is a non-rotary member, whereby the mean power output torque will be of the same magnitude as the average value of the torque pulses applied to the first member in the said one of the directions.

4. A power transmission, as in claim 1, including a torsionally resilient means interconnecting the first member and the power output member for smoothing the pulsations of torque transmitted to the power output member.

5. A power transmission, as in claim 1, including a flywheel rotatively fast with the power output member for smoothing the pulsations of torque transmitted to the power output member.

6. A power transmission, as in claim 1, including a further flywheel rotatively fast with the power input member and to which flywheel is connected the means for converting the input torque into the cyclically fluctuating torque, whereby to reduce the feedback of the cyclical fluctuations to the power input member.

7. A power transmission, as in claim 1, including means for optionally varying the average value of the torque pulses in either direction.

8. A power transmission, as in claim 1, in which the means for converting the input torque into the cyclically fluctuating torque includes a flexible element connected between the power input member and the said first member for transmitting the torque therebetween, and means for cylically varying the deflection of the flexible element whereby to generate the cyclical fluctuation in torque.

9. A power transmission, as in claim 8, including a crank fast with the first member, and the flexible element is connected between the throw of the crank and a radially displaced portion of the power input member, whereby relative rotation between the power input member and the crank will produce the cyclically varying deflection of the flexible element.

10. A power transmission, as in claim 9, in which the means for optionally varying the average value of the torque pulses includes a further flexible element connected between the throw of the crank and a further radially displaced portion of the power input member, and the further radially displaced portion is movable circumferentially by actuator means relative to the said one radially displaced portion to alter the phase of the torque pulses generated on the crank by the said flexible element relative to those generated by the further flexible element, whereby the resultant torque may be varied.

11. A power transmission, as in claim 9, including a further crank fast at 180° to the said crank and for each of the said flexible elements is provided a corresponding flexible element operative on the further crank and on a corresponding radially displaced portion of the power input member positioned at 180° to each of the aforesaid radially displaced portions, whereby to balance the radial forces on the first member and the power input member.

12. A power transmission, as in claim 10, in which the actuator means includes an electric motor.

References Cited
UNITED STATES PATENTS

| | | | |
|---|---|---|---|
| 1,803,458 | 5/1931 | Berry | 74—63 |
| 1,881,234 | 10/1932 | Ljungstron | 74—64 |
| 3,490,299 | 1/1970 | Binner | 74—63 |

MILTON KAUFMAN, Primary Examiner